United States Patent Office 3,026,659
Patented Mar. 27, 1962

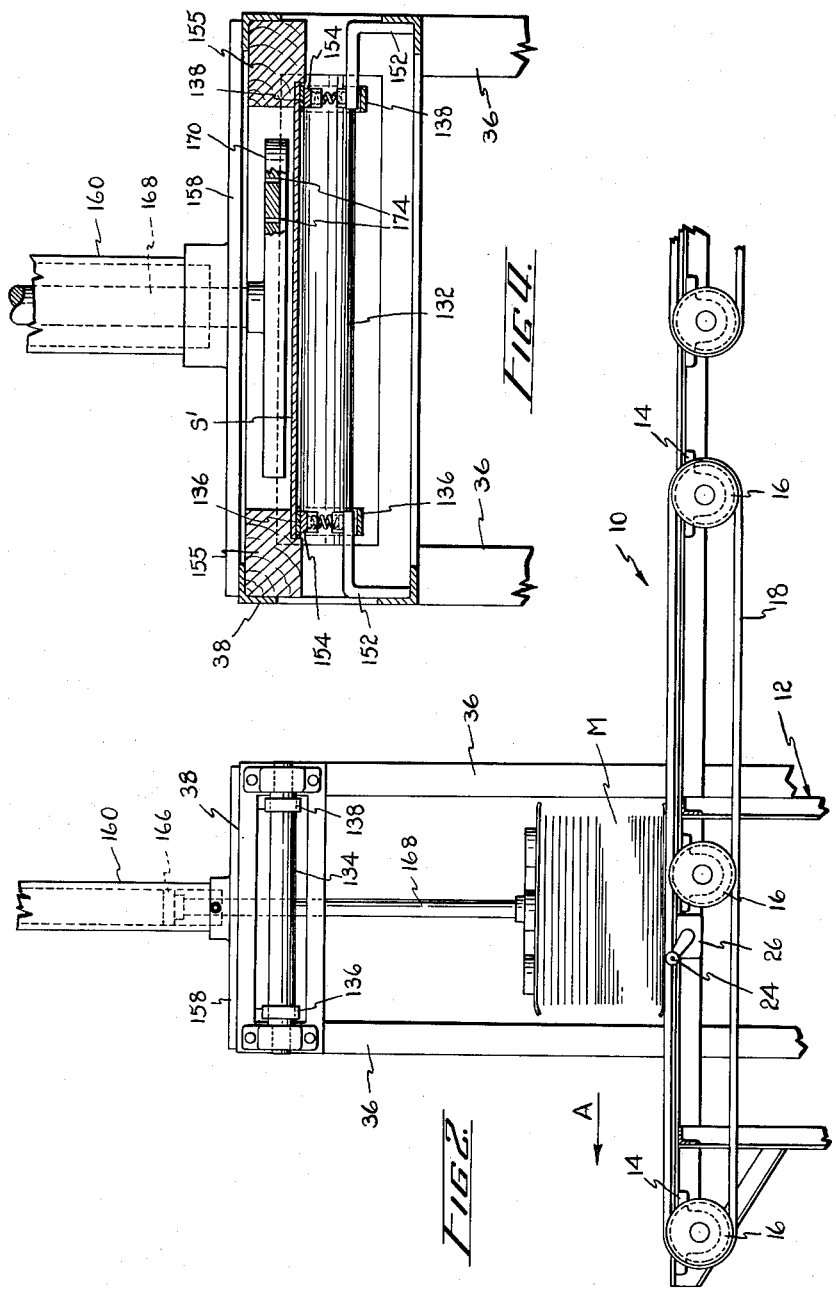

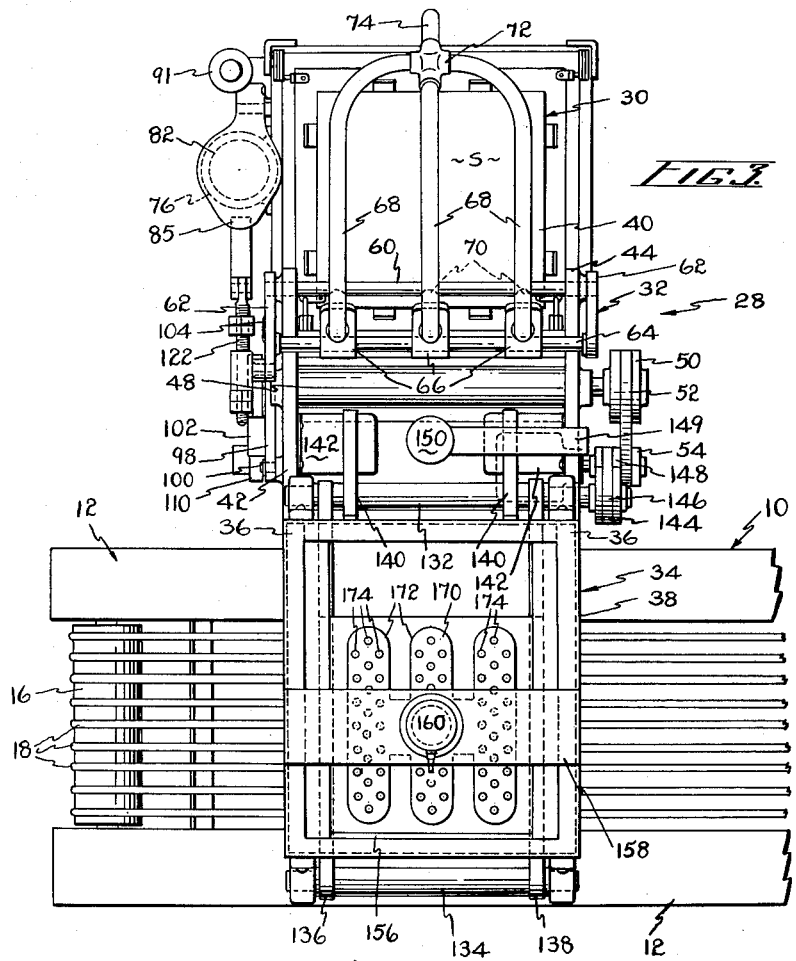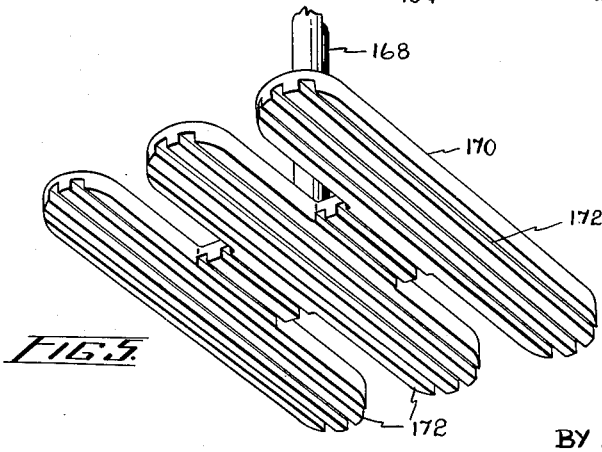

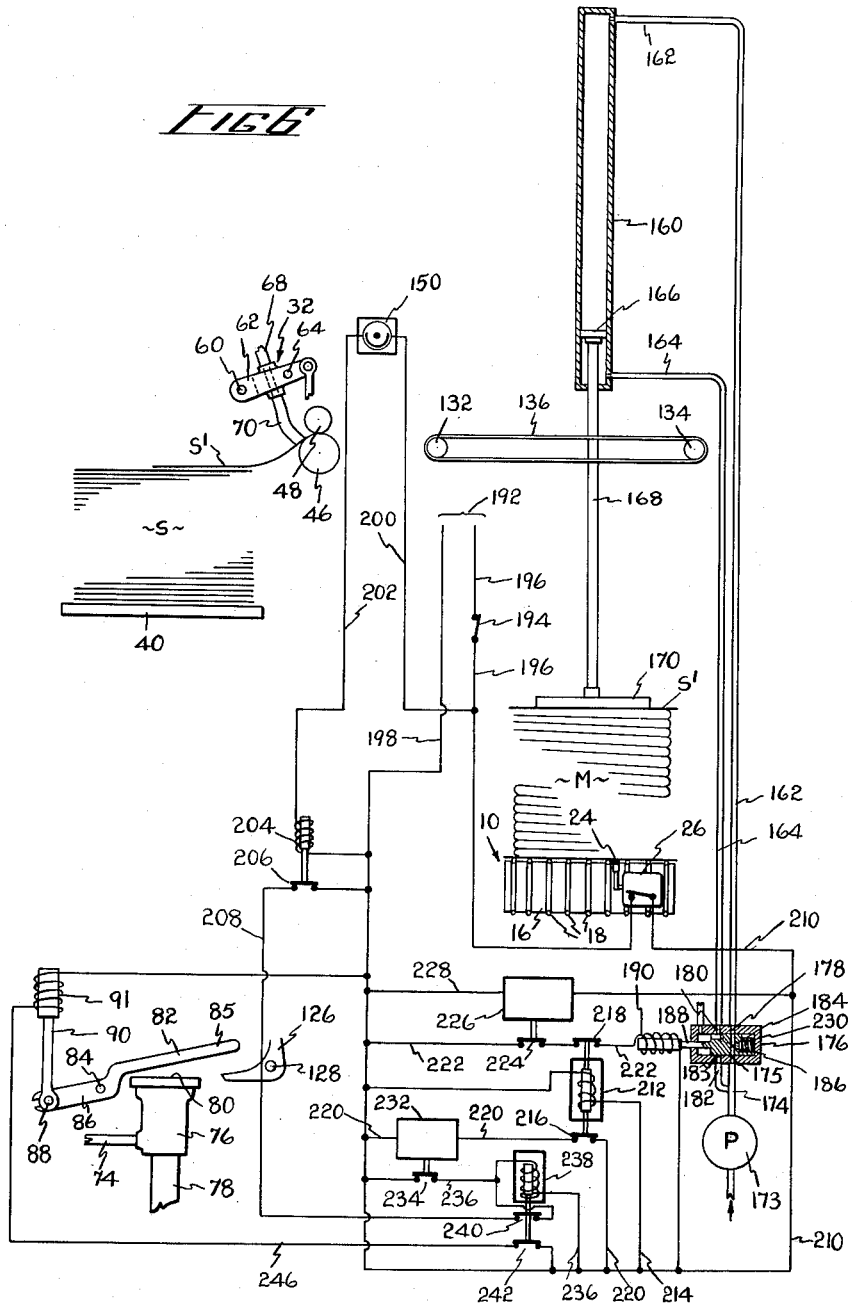

3,026,659
APPARATUS AND METHOD FOR POSITIONING AN OVERWRAP SHEET ABOVE MATERIAL TO BE WRAPPED
James Harrison, Thornhill, Ontario, Canada, assignor to The Globe and Mail Limited, Toronto, Ontario, Canada, a corporation of Ontario
Filed Jan. 4, 1960, Ser. No. 140
12 Claims. (Cl. 53—74)

This invention relates generally to wrapping apparatus and is particularly concerned with automatically positioning an overwrap sheet on material to be wrapped. This apparatus and method is especially adaptable for use in wrapping piles of newspapers or the like, and as will become apparent can be used wherever an overwrap sheet is required.

The apparatus and method of this invention is especially adapted to be used in conjunction with the invention of my co-pending application S.N. 840,279 for Apparatus and Method for Positioning an Underwrap Sheet Beneath Material To Be Wrapped, filed September 16, 1959.

A primary object of the invention is to provide a novel method and apparatus for readily, expeditiously and automatically depositing in an oriented position an overwrap sheet on material being wrapped.

A further object of the invention is to provide apparatus motivated in an overwrap sheet-depositing cycle in relation to movement of the material upon which an overwrap sheet is to be deposited due to the material reaching a station at which the overwrap sheet is to be applied.

A still further object of the invention is to provide in apparatus of the character set forth means whereby an overwrap sheet is automatically conveyed from an overwrap sheet-magazine horizontally above a deposit station and means to move the sheet from its conveyed position onto the material being wrapped.

And yet another object of the invention is to provide a horizontal conveyor for material to be disposed at a wrapping station, means automatically initiating an overwrap sheet-depositing cycle when the wrapping station is reached by the material being wrapped, and means automatically conveying the material with the overwrap sheet disposed thereon away from the station to permit subsequent operating cycles of the apparatus.

Other objects and advantages of this invention will become apparent from a consideration of the following description taken in connection with the accompanying drawings, wherein an exemplary embodiment of the invention is disclosed:

In the drawings:

FIGURE 2 is a front elevation of FIGURE 1, with portions shown in section, showing the presser plate of the apparatus in a sheet-depositing position;

FIGURE 3 is a top plan view of the apparatus of FIGURES 1 and 2;

FIGURE 4 is an enlarged section taken substantially on line 4—4 of FIGURE 1;

FIGURE 5 is an enlarged fragmentary perspective view showing the underside of the presser plate of the invention; and FIGURE 6 is a circuit diagram of the control system of the apparatus.

Figure 1:
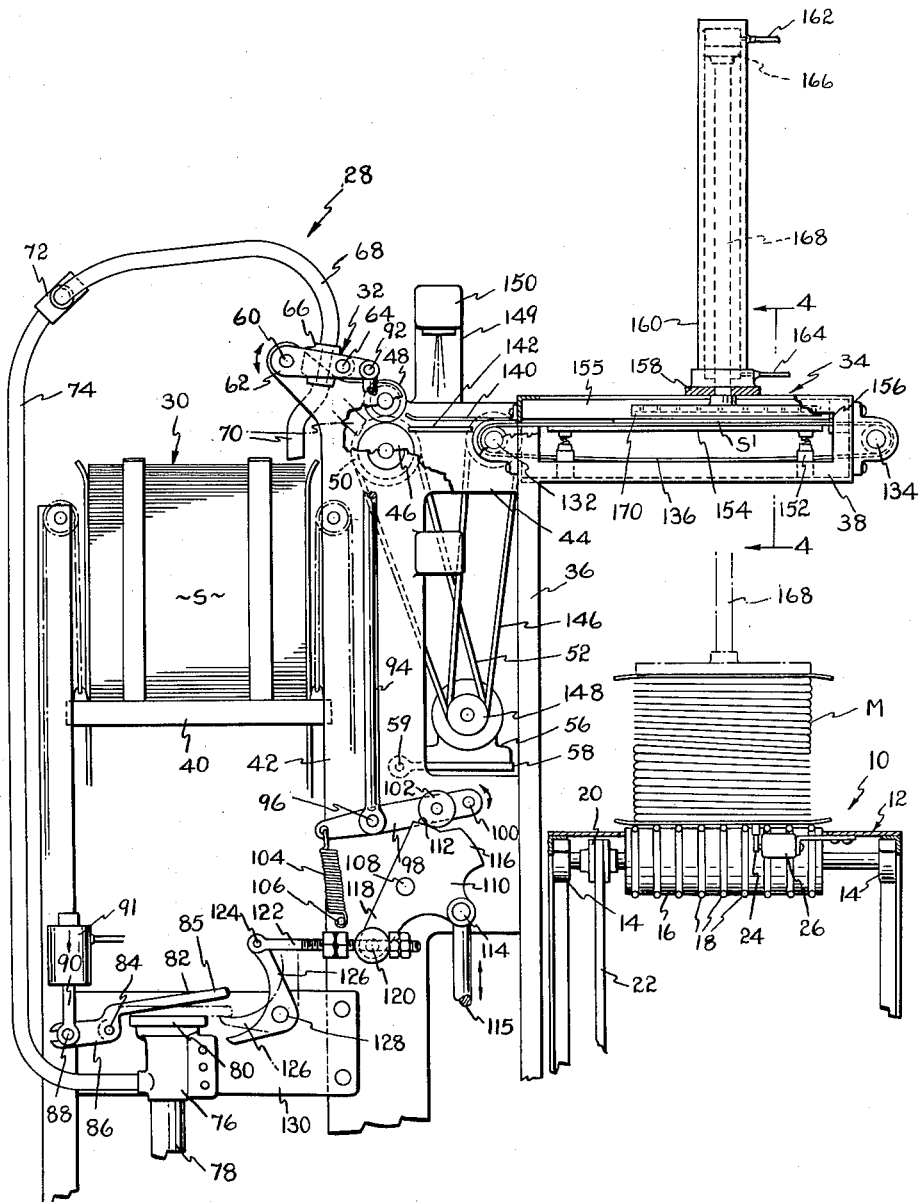
FIGURE 1 is a side elevation of the sheet depositing apparatus, with portions broken away and shown in section for clarity, and showing by phantom lines alternate positions of parts for the purpose of illustrating operation.

Referring to the drawings in detail, an endless conveyor is indicated generally at 10, this structure comprising in the exemplary embodiment a portion of a similar conveyor disclosed in the above-mentioned co-pending application. The conveyor 10 comprises a suitable support structure 12 having journaled in bearings 14 support shafts of longitudinally spaced, cylindrical rollers 16 over which are entrained transversely spaced endless belts 18 which define a horizontal path of travel for material M. The material M may comprise a stack of newspapers which would have disposed therebeneath an underwrap sheet by means of the apparatus of the mentioned co-pending application. The endless belts 18 are continuously driven by means of a pulley 20 and drive belt 22 operatively connected to a suitable driving motor (not shown).

Disposed in the path of travel defined by the conveyors is a depressible control switch 24 of a microswitch 26 which initiates an overwrap sheet-depositing cycle as the material M moves in the direction indicated by direction arrow A of FIGURE 2. The location of the microswitch 26 may be described as the overwrap sheet-depositing station of the apparatus.

The automatic sheet depositing apparatus is indicated generally at 28 and comprises cooperating components as indicated by general reference characters, including an overwrap sheet supply magazine 30, sheet transporting-and-conveying mechanism 32 which includes a sheet separator and sheet conveyor and sheet depositing mechanism 34. In addition to the just mentioned components, there is included automatically operated control mechanism which will subsequently be described in detail.

The apparatus 28 comprises a framework which may be of a welded construction, including suitably braced spaced side frame members 36 extending above the conveyor 18 and terminating in a laterally extending support frame 38 of the sheet depositing mechanism 34, which will subsequently be described in detail.

The supply magazine 30 includes a conventional feed table 40 upon which is disposed a stack of overwrap sheets S. This table 40 is automatically adjusted vertically to assure that the disposition of the uppermost overwrap sheet will always be disposed at a predetermined level to be transported to the sheet transporting-and-conveying mechanism 34. The table 40 and the mechanism for maintaining the level of the sheets S is not shown in detail since this structure is well known to those skilled in the art and per se is not novel.

The side frame members 36 have extending therefrom, away from the conveyor 18, spaced support plates 42 and 44 disposed on opposite sides of the table 40 of the magazine 30. Suitably journaled transversely of the plates 42 and 44 is a driven, externally knurled feed roller 46 underlying a suitably journaled, rubber surfaced roller 48. The support shaft of the roller 46 includes thereon a pulley 50 over which is entrained a drive belt 52 operatively connected to a drive pulley 54 of a motor 56. The motor is supported on a plate 58 pivotally mounted on a transverse shaft 59 carried by the plates 42 and 44 whereby the weight of the motor causes the belt to be under tension.

A transverse support shaft 60 extends between upper rear portions of the plates 42 and 44 and pivotally supports at its terminal ends the rear ends of vertically pivotal levers or arms 62. The levers 62 have extending therebetween a support shaft 64 upon which are journaled transversely spaced pipe clamps 66. The clamps 66, there being three disclosed, each are secured to an intermediate portion of a pipe 68 providing a depending nozzle 70 which comprises the sheet engaging structure of the separator which will normally be disposed with their terminal ends overlying the transverse edge of an uppermost overwrap sheet, and which will oscillate to the phantom line position of FIGURE 1, where they are positioned adjacent the entrance formed between the rollers 46 and 48. It is apparent that by oscillating the nozzles 70 between the solid and phantom line positions, the topmost of the sheets S' will be separated from the stack and transported to the sheet conveyor or pickup rollers 46 and 48.

The pipes 68 are connected to a manifold connector 72 which communicates through a pipe 74 to one side of a control valve 76. The valve 76 communicates at its lower end with a pipe 78 connected to a suction pump or the like (not shown). The valve includes a flat upper seat 80 upon which is engageable a vertically pivotal flap valve element 82 pivotally supported at 84 on the valve body. The valve element 82 includes a protruding lip portion 85, for a purpose to be described, and a bifurcated lever portion 86 connected by a pin 88 to the lower end of a solenoid armature 90 of a solenoid 91 which when deenergized will permit the flap valve element to be held open in the solid line position shown in FIGURE 1. When the flap valve element 82 is disposed in the phantom line position, seated on the seat 80, pressure will be reduced in pipes 74, 68 and at nozzles 70 which will result in the uppermost overwrap sheet being picked up from the stack S. The sheet will then be moved toward the right, see FIGURE 6, and at this time the flap valve element 82 will be raised from the seat 80 resulting in an equalizing of the pressure in the aforementioned pipes and at the nozzles to permit the sheet to be released and drawn between rollers 46 and 48.

In order to accomplish the aforementioned function of the valve 76 and nozzles 70, one of the levers or arms 62 is pivotally connected by a pin 92 to a depending force transmitting rod 94 which is pivotally connected by a pin 96 to an intermediate portion of a vertically pivotal lever 98 mounted for pivotal movement on a stub shaft 100 carried by the plate 42. The lever 98 has journaled on an intermediate portion thereof a vertically disposed circular cam follower 102, and the lever is connected at its end opposite the stub shaft 100 to a tension spring 104 which is anchored to a pin 106 on the plate 42. The spring 104 urges the lever 98 and cam follower 102 downwardly and at the same time disposes the nozzles to the solid line position overlying the top and forward edge of an overwrap sheet.

Pivotally mounted on the plate 42 at 108 is an oscillating cam element 110 having an upper camming edge 112 which is engaged by the follower 102. The cam element 110 is connected by a pin 114, offset from the pivot 108, to a constantly reciprocating force transmitting rod 115 which oscillates the lever 98 due to the raised portion 116 of the camming edge 112 causing the rod 94 to reciprocate resulting in the previously mentioned oscillating movement of the nozzles 70. The cam element 110 includes an offset lever portion 118 which is pivotally connected at 120 to an adjustable bolt 122. The bolt 122 is connected at 124 to one end of an L-shaped lever 126 which is pivotally mounted at 128 on an extension plate 130 carried on the plate 42. The lever 126 will oscillate between the solid and phantom line positions shown in FIGURE 1, the throw being controlled by the adjustable bolt 122, and this movement will result in the lifting of the flap valve element 82 off of the seat 80, or permitting the same to be seated. It will be noted that when the nozzles 70 are disposed in the solid line position, the flap valve element will be seated, and when the nozzles are disposed in the phantom line position, the flap valve element will be unseated.

The support frame 38 of the sheet depositing mechanism 34 is substantially rectangular as seen in FIGURE 3, and carries transversely spaced, parallel support shafts 132 and 134 respectively journaled at opposite ends of the frame. The shafts 132 and 134 have entrained thereover adjacent opposite sides of the frame 38 spaced endless conveyor belts 136 and 138, the upper run of which defining a path of movement substantially in alignment with the overlying cooperating portions of the rollers 46 and 48. Projecting from the frame 38 are upper guide fingers 140 overlying inwardly extending support plates 142 secured to the support plates 42 and 44. These fingers and plates define a receiving throat in alignment with the upper run of the belts 136 and 138 and the cooperating portions of the rollers 46 and 48 to guide the overwrap sheet in its path of movement. The rear shaft 132 includes a driven pulley 144 over which is entrained a drive belt 146 entrained over a driving pulley 148 on the motor 56.

Supported on an L-shaped support 149 carried by the side plate 44 is a downwardly directed photo-electric cell 150 which as seen in FIGURES 1 and 3 will be affected by the edge of an underwrap sheet as it moves from the rollers 46, 48 to the belts 136, 138. The function of the photo-electric cell in the control circuit will become apparent during the description of FIGURE 6 and the operation of the apparatus.

Referring once more to the frame 38, inwardly directed brackets 152 support spring biased presser plates 154 underlying the undersurface of the belts 136, 138 as seen in FIGURES 1 and 4. Upper abutment blocks 155 overlie the belts 136 and 138 insuring that the side edges of an overwrap sheet are firmly gripped by the belts and blocks without any sag on the unsupported center of such sheets.

A vertical stop 156 is provided adjacent the outer end of the frame 38 and in the path of travel defined by the belts 136, 138 to engage the leading edge of a sheet and orient it into a position from which it will be disposed onto the material M. The conveyor belts 136 and 138 are constantly operating to cause the sheets to be held against the stop 156.

Supported transversely on the frame 38 is a support plate 158 upon which is mounted a vertically disposed double acting fluid motor including a cylinder 160 connected at its upper and lower ends to pressure-fluid lines 162 and 164, respectively. The cylinder 160 has reciprocably disposed therein a piston 166 connected to a piston rod 168. The piston rod 168 is secured at its lower end to a presser foot or plate 170 which comprises a plurality of slotted foot portions 172 which have transverse apertures 174. The apertured construction facilitates reciprocation of the plate 170 without taking a deposited overwrap sheet, since the upward resistance to movement of the plate will be prevented and a partial vacuum will not be created when withdrawing the plate from the phantom line position shown in FIGURE 1 to the normal raised position.

The cycle of operation and method of the apparatus will be described through the use of FIGURE 6 together with the description which has been heretofore provided.

*Operation*

A fluid pressure pump 173 has its output line 174 connected to an inlet port 175 of a two-position control valve 176, which includes spaced outlet ports 178 and 180. A branch line 182 communicates with a second port 183. The ports 175 and 183 are disposed in spaced alignment with outlet ports 178 and 180, respectively, which are connected by lines 162 and 164, respectively, to the cylinder 160. A slide valve element 184 includes a transverse passage 186 alignable with the aligned ports 175, 178 or 183, 180. The slide valve comprises an extended portion 188 comprising a solenoid armature subject to movement by energization by a solenoid core 190.

The table 40 of the overwrap sheet magazine 30 is loaded and the top sheet S' will be disposed beneath the nozzles 70. An overwrap sheet S' will be disposed beneath the presser plate 170.

A source of potential 192 is controlled by a master switch 194 in series in a line 196. The return or ground line of the circuit is indicated at 198. The closing of the master switch 194 results in the energizing of the motor 56 to operate the conveyor rollers 46, 48 and belts 136, 138 in addition to operation of the pump 173 and a suction pump (not shown) connected to the pipe 78. All of this structure operates constantly.

The master switch 194 closes a circuit through lines 200, 202 to the photo-electric cell 150 and to a solenoid relay 204 connected in series with the cell 150. The relay 204 controls a switch 206 controlling current flow through line 208. The circuit to the photo-electric cell normally remains closed upon the closing of the switch 194 and the circuit is broken momentarily when an overwrap sheet S' passes between the rollers 46, 48 and belt conveyors 136, 138. It will be noted that all other control circuits, to be described in detail, will be open due to the fact that the micro switch 26 is open until the material M is conveyed into the proper position beneath the conveyors 136, 138.

When the microswitch 26 is closed by a pile of material M engaging the arm 24, current will flow from line 196 to a line 210 connected to the solenoid 190 urging the portion 188 of the control valve 184 to the right and directing fluid pressure from the pump 173 through ports 175, 178 via passage 186 to the line 162 and above the piston 166 to urge the pressure plate 170 with an overwrap sheet disposed therebeneath on top of the material M.

Also energized with the closing of the microswitch is a control relay 212 which is connected by line 214 to line 210. The control relay 216 is energized as long as the microswitch 26 is closed, i.e., as long as the material M overlies the lever 24, and when the relay 212 is energized contacts 216 and 218 in lines 220 and 222, respectively are closed. The line 222 is connected to line 198 and has in series therein contacts 224 of a time delay relay 226 connected in line 228, which is connected between lines 198 and 210 resulting in energization of the delay relay 226 upon closing of microswitch 26. The contacts 224 are closed for approximately one (1) second and after opening thereof the armature 190 is de-energized resulting in the fluid pressure from the pump 173 being directed to line 164, beneath the piston 166 and the raising of presser plate 170. The valve 184 is normally urged to a leftward position by a return spring 230 which will result in the alignment of ports 183, 180 with passage 186. The described grooves and perforations of the presser plate facilitate ready vertical movement of the plate.

The previously mentioned contacts 216 are connected in series with a second time delay relay 232 which when energized will close contacts 234 in line 236 after approximately ⅟₂₅ second delay, line 236 is connected to a relay 238 effective, when energized, to close contacts 240 and 242. The contacts 240 are connected in a line 244 to the contacts 206 controlled by energization of the photo-electric cell 150. When a sheet S' passes beneath the cell 150, current will cease to flow in line 202 and contacts 206 will be momentarily opened and this will result in de-energizing relay 238 to open contacts 240 and 242.

The contacts 242 are connected in series in a line 246 connected to the solenoid 91 and when these contacts are closed the flap valve element 82 will be closed thus causing suction at the nozzles as previously mentioned. When the contacts 242 are opened, the solenoid 91 will be de-energized permitting the flap valve element 82 to be raised. With the contacts 240 open, the line 208 will not be energized until the control relay 238 is again energized by completion of a circuit through contacts 234. The contacts 234 will not be re-set or closed until the control line 220 is re-energized by the closing of contacts 216 subject to control by energization of the microswitch 26.

The sequence or steps are as follows:

The material M closes switch 26 resulting in fluid pressure being directed to the cylinder 160 to cause the plate 170 to deposit overwrap sheet S' on top of the material. The fluid pressure was directed to accomplish this function due to energization of the time delay relay 226 which will be deenergized after a predetermined interval after which the presser plate will be raised.

At the same time a second time delay relay 232 was energized due to the energization of the relay 212 and closing of contacts 216. When energized, the contacts 234 of the relay 232 will remain closed for approximately ⅟₂₅ second, and will then open. While contacts 234 remain closed current will flow to a relay 238 closing contacts 240 and 242. A contact 242 remains closed after contact 234 of relay 232 are broken due to the fact that current will still flow through the holding contact 240 in the line 208. The contact 242 permits current to flow to solenoid 91 resulting in the closing of flap valve element 82 and causing a sheet S¹ to be moved from a magazine or pile S by the nozzle 70 to the rollers, 46, 48. As the sheet S¹ moves it passes beneath the cell 150 causing the circuit to a holding coil 204 to be interrupted in opening contact 206. The opening of contact 206 causes the relay 238 to be de-energized and contacts 240 and 242 to be opened. Although the circuit through line 208 is broken only momentarily—i.e., while the sheet S1 is passing beneath the cell 150, the relay 232 cannot be energized and therefore the contacts 240 and 242 will not be closed until the relay 232 is deenergized. The relay 232 cannot be deenergized until the switch 26 opens. This insures the solenoid 91 will be energized once each time a pile M passes over the switch 26. Consequently only one sheet S¹ will be fed into position beneath the presser plate 170 during each cycle.

The construction shown and the method described embodies the invention in its preferred form, however, it is intended that the foregoing be illustrative rather than definitive, the invention being defined in the appended claims.

The embodiments of the invention in which an exclusive property or privilege is claimed are defined as follows:

1. Apparatus for depositing an overwrap sheet upon material such as a stack of newspapers or the like comprising in combination conveying means for carrying the material along a horizontal path of travel, control means disposed in the path of travel of said conveying means for engagement by the stack of material, overwrap sheet-depositing means overlying said path of travel, overwrap sheet magazine means, overwrap sheet-conveying means interposed between said magazine and sheet depositing means, and operating means connected to said overwrap sheet conveying and depositing means and operatively connected to and placed into operation by said control means for operating in a predetermined sequence the depositing means and said overwrap sheet conveying means to place an overwrap sheet on the material engaging said control means, said overwrap sheet conveying means comprising vertically oscillating and periodically effective suction nozzles mounted on a horizontal axis of rotation, a pair of horizontally disposed pick-up rollers in alignment with said suction nozzles for receiving an overwrap sheet therefrom, and a pair of spaced parallel and horizontally disposed endless conveyors in alignment with said pick-up rollers and disposed in overlying relation to said material conveying means.

2. The combination of claim 1; said sheet depositing means comprising a vertically reciprocating, periodically operated presser foot overlying said pair of endless conveyors and extendable therebetween.

3. The combination of claim 2; further comprising abutment means overlying said endless conveyors for engaging an overwrap sheet disposed on the conveyors, and resilient means disposed beneath said endless conveyors and urging the upper run thereof toward said abutment means whereby an overwrap sheet fed from said pick up rollers to said conveyors will be grippingly engaged at opposite edges subsequent to deposit on the stack of material.

4. The structure of claim 1; said overwrap sheet depositing means comprising a vertically reciprocated, fluid-motor operated presser plate extendible between said parallel conveyors toward said material conveying means.

5. The structure of claim 1; said operating means including photo-electric control means subject to sense the presence or absence of an overwrap sheet moving from said magazine to said sheet depositing means, said overwrap sheet conveying means including a control valve for creating a suction in said suction nozzles in response to sensing the absence of an overwrap sheet by said control means.

6. The structure of claim 5; further comprising constantly operated force transmitting means periodically oscillating said suction nozzles and rendering said control valve inoperative, an electro-magnetic force transmitting means operatively connected to said control valve and photo-electric cell control means, said sheet-depositing means including a fluid pressure operated motor, a fluid control valve operatively connected to said fluid motor, a second electro-magnetic force transmitting means operatively connected to said fluid control valve, said electro-magnetic force transmitting means being subject to operation by said control means, time delay relay means operatively connected to said fluid control valve through said second electro-magnetic force transmitting means and second time delay relay means operatively connected to said first mentioned electromagnetic force transmitting means and said photo-electric cell for de-activation of said suction operated pick up assembly after said sheet-depositing means has been de-activated.

7. Apparatus for depositing an overwrap sheet upon material comprising in combination conveying means for moving material along a path of travel, control means for positioning said conveying means in a position where an overwrap sheet will be deposited on the material conveyed, magazine means for a supply of overwrap sheets, sheet depositing means for depositing a sheet on the material positioned by said control means, means for removing an overwrap sheet from said magazine means and conveying the sheet to said depositing means and including an intermittently operable sheet separator and sheet conveyor, and means sensing the absence of an overwrap sheet moving to the sheet depositing means to actuate the sheet separator and convey an overwrap sheet to said sheet depositing means.

8. The combination of claim 7; said conveying means comprising an endless conveyor.

9. The combination of claim 7; said sheet depositing means comprising a power operated plunger overlying said conveying means.

10. The combination of claim 7; said sheet separator comprising suction operated nozzle means.

11. The combination of claim 7; said sheet conveyor including continuously operated conveying rollers.

12. The combination of claim 7; said means sensing the absence of a sheet moving to the sheet depositing means comprising a photo electric cell assembly.

References Cited in the file of this patent

UNITED STATES PATENTS

| | | |
|---|---|---|
| 1,478,464 | Waters | Dec. 25, 1923 |
| 1,938,654 | Braren | Dec. 12, 1933 |
| 2,325,774 | Hohl | Aug. 3, 1943 |
| 2,695,483 | Toews | Nov. 30, 1954 |
| 2,936,560 | Gentry | May 17, 1960 |
| 2,953,883 | Gentry | Sept. 27, 1960 |